Sept. 30, 1941.  R. C. McCLAY  2,257,182

FILM SPLICING DEVICE

Filed Nov. 15, 1937  2 Sheets-Sheet 1

INVENTOR
ROY C. McCLAY
BY W E Beatty
ATTORNEY

Sept. 30, 1941.   R. C. McCLAY   2,257,182
FILM SPLICING DEVICE
Filed Nov. 15, 1937   2 Sheets—Sheet 2
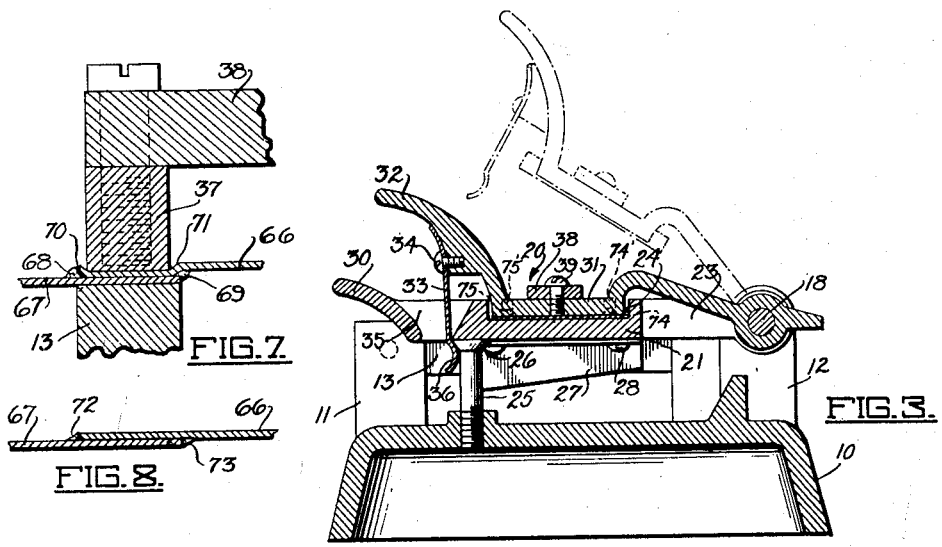
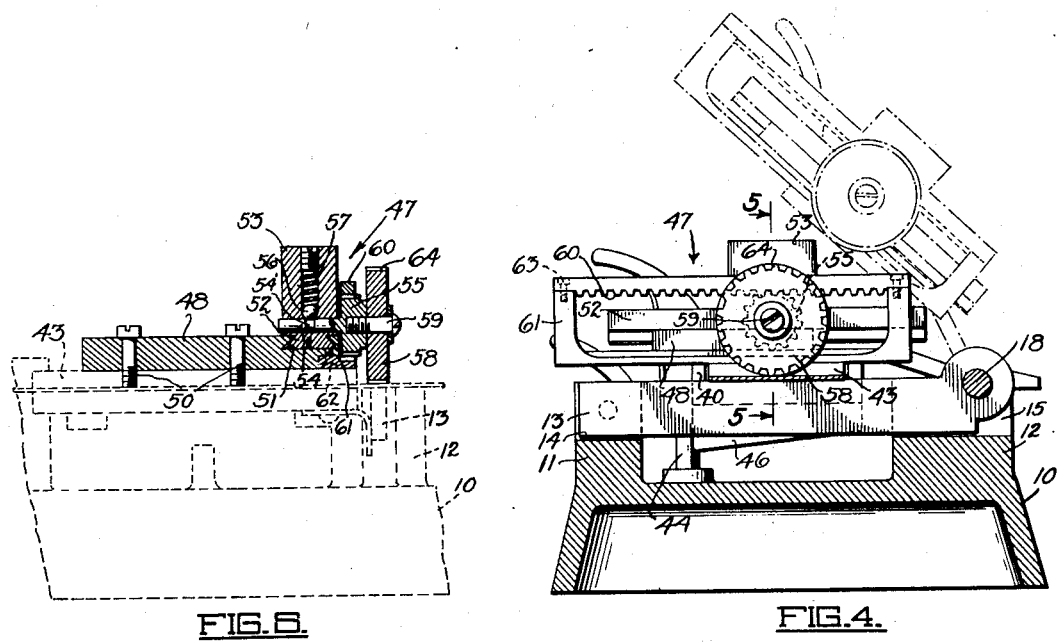
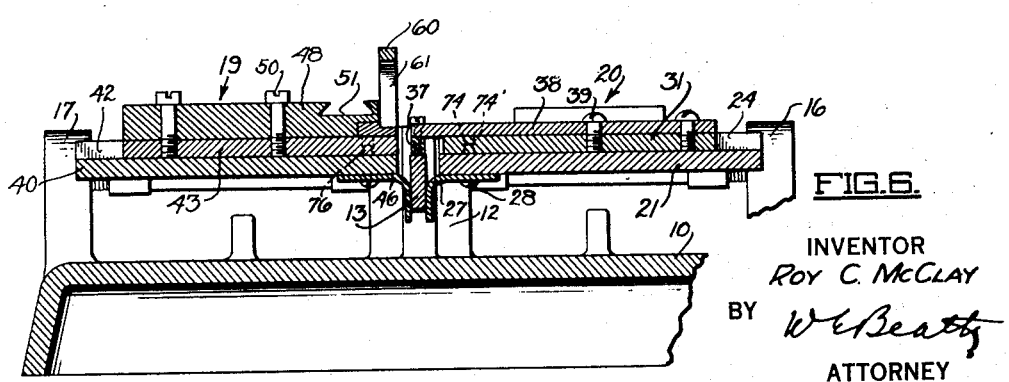
INVENTOR
ROY C. MCCLAY
BY W E Beatty
ATTORNEY Patented Sept. 30, 1941

2,257,182

UNITED STATES PATENT OFFICE 2,257,182

FILM SPLICING DEVICE

Roy C. McClay, West Los Angeles, Calif., assignor to Warner Bros. Pictures, Inc., New York, N. Y., a corporation of Delaware Application November 15, 1937, Serial No. 174,564

4 Claims. (Cl. 154—42)

My invention relates to a film splicing device for splicing the broken or cut ends of a pair of films together in lapped relation.

One object of my invention is to mechanically remove the emulsion or top surface from a film for splicing purposes.

Another object is to utilize a shearing member in a splicing machine to support a film while removing the emulsion therefrom.

Another object is to remove the emulsion of a film by a slicing action.

Another object is to remove the emulsion from a film at a relatively high velocity.

Another object is to reduce the wear of an emulsion removing element.

Another object is to reduce the tendency of a film splice to break.

I am aware of the fact that film scraping elements in the form of end mills have heretofore been employed for removing the emulsion or upper surface of a film to be spliced. However, this type of scraper is necessarily limited in cutting surface to the width of the emulsion to be removed as well as being limited to the number of radial cutting edges or teeth formed thereon. This often results in a clogged cutter, necessitating frequent cleaning as well as frequent sharpening. Furthermore, because of the fact that the film may not always lie flat against the supporting surface on which it is scraped, due to its tendency to curl, the cutting surfaces of the end mills cannot be moved in a flat plane while passing onto the film surface because of the danger of the end mills cutting into the body of the soft film. Therefore the end mills must first be brought over the film surface while out of contact therewith, and thereafter moved into contact with the surface before being drawn thereacross.

The use of single edged blades or knives for scraping the emulsion is also disadvantageous in that a single edge wears quickly, necessitating frequent sharpening. Furthermore a single edge when moved parallel with the film surface has a tendency to dig into the film body due to the semi-plastic condition of the cellulose derivative of which the film is formed, thereby causing uneven scraping or "chattering."

According to my invention the film from which the emulsion is to be removed is preferably supported, with its emulsion surface uppermost, upon a shearing member used to shear the end of the film. A cutting wheel having a large number of cutting teeth on the periphery thereof, preferably helical in form, is moved, while rotating, across the supported portion of the film with the periphery thereof in contact with the emulsion surface. Means actuated by the bodily movement of the wheel are provided to rotate the wheel whereby the periphery thereof is moved at a greater velocity than the bodily movement of the wheel, resulting in a high cutting velocity.

By helically forming the cutting teeth of the wheel, a slicing action instead of a scraping action is imparted to each of the teeth resulting in a clean cut, without the appearance of chatter marks. Furthermore, the use of helical teeth permits a gradual slicing movement of each tooth entering into the emulsion or upper surface of the film and permits the cutting wheel to be passed in a straight line onto and over the film surface without the cutting wheel tending to dig into the body of the film especially when first contacting the edge thereof.

A splice is made according to my invention by removing the emulsion from the end of one of a pair of films to be spliced, preferably as above described and then over-lapping the ends of those films, cementing the over-lapped ends, and thereafter pressing the films together over an area less than the overlapped portions. This action permits the cement exuded from the pressed portion of the over-lapped films to gather at the extreme over-lapped ends of the films, slightly raising them. This insures a generous quantity of cement and therefore a secure bond at the tips, and when the cement dries these tips are drawn onto the main body of the over-lapped film with a reinforcing fillet resulting at each over-lapped end.

The manner of accomplishing the above and other objects of the invention will be more readily understood on reference to the following specification read in conjunction with the accompanying drawings wherein:

Fig. 3 is a transverse sectional view taken along the line 3—3 of Fig. 2.

Fig. 4 is a transverse sectional view taken along the line 4—4 of Fig. 2.

Fig. 5 is a sectional view through the emulsion removing attachment and is taken along the line 5—5 of Fig. 4.

Fig. 6 is a longitudinal sectional view taken along the line 6—6 of Fig. 2.

Fig. 7 is an enlarged fragmentary view of the shear and pressure bars and is taken along the line 7—7 of Fig. 2.

Fig. 8 is an enlarged sectional view through a film splice made in accordance with my invention.

Figures 1, 2:
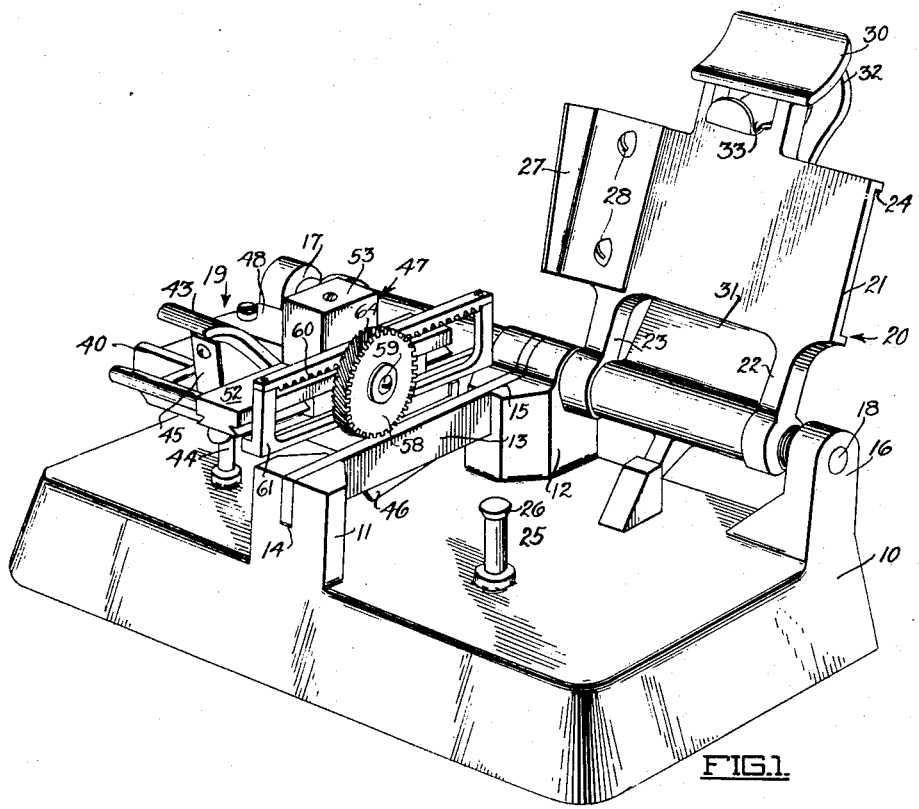
Fig. 1 is a perspective view of a film splicing device embodying my invention.
Fig. 2 is a plan view of the film splicing device.

The film splicing device comprises a rectangular base 10 having a pair of centrally located and upwardly extending projections 11 and 12. A hardened steel shear bar 13 extends across the projections 11 and 12 and is received in and suitably clamped in slots 14 and 15, respectively, therein. A second pair of upwardly extending projections 16 and 17 at the back of the base 10 as well as the projection 12 support a longitudinally extending shaft 18. A pair of film clamps 19 and 20 is provided on either side of the shear bar 13, hingedly supported on the shaft 18. The clamp 20 comprises a lower film support plate 21 hinged to the shaft 18 through arms 22 and 23. The plate 21 has a channel 24 formed longitudinally therein to support the end of a film to be spliced. Plate 21 is adapted to be supported, with the surface of the channel 24 in alignment with the upper surface of the shear bar 13, by means of a stud 25 extending upwardly from the base 10 and having a bevelled head 26 formed thereon. A shearing knife 27 is secured by screws 28 to the bottom of the plate 21 and is adapted to co-act with the right hand edge of the shear bar 13 to cut the end of a film supported on top of the bar 13 when the plate 21 is moved downward. Locating pins 74 and 75 extending upwardly from the bottom of the film channel 24 are adapted to engage a pair of opposed sprocket perforations in a film supported in the clamp 20 to accurately align the film in respect to another film onto which it is to be spliced. A thumb lug 30 extends from the plate 21 permitting the plate to be moved about shaft 18.

A pressure pad 31, also forming part of the clamp 20, is independently hinged on the shaft 18 between the arms 22 and 23 and has a flat surface thereon formed in alignment with the channel 24 of plate 21 for the purpose of clamping a film in the channel. Apertures 74' and 75' in the pressure pad 31 are provided to receive the pins 74 and 75, respectively, when the pad 31 is closed. A thumb lug 32 is formed on the pad 31 for moving the same about shaft 18. A leaf spring 33 is secured to the under surface of the lug 32 by means of a screw 34 (Fig. 3) and is adapted, when the pressure pad 31 and plate 21 are closed, to extend through an opening 35 formed in the plate 21. When in this position the curved end 36 of the spring 33 engages the beveled head 26 of the stud 25 to hold the members 21 and 31 in a clamped position.

A pressure bar 37, in vertical alignment with the shear bar 13, is carried by the pressure pad 31 through a resilient spring bar 38 secured to the pad 31 by screws 39. Pressure bar 37 is adapted, when the plate 21 and pressure pad 31 are in a closed position, to clamp a pair of superimposed cemented films supported by the shear member 13 together to form a splice.

The clamp 19 is identical with that of 20 and comprises a lower film supporting plate 40 hinged to the shaft 18 through arms 41 and 41' and has a film supporting channel 42, similar to that of 24 of the plate member 21, formed therein. Locating pins 76 and 77 are formed in the channel 42 to accurately locate a film clamped in clamp 19. A pressure pad 43, similar to that of 31, is independently hinged to the shaft 18 intermediate the arms 41 and 41'. The plate 40 and pad 43 are supported and clamped in alignment with the upper edge of the shear bar 13 by means of a stud 44 and a leaf spring 45 employed in a manner identical with that of stud 25 and spring 33 of the clamp 20. A shearing knife 46, similar to that of 27, is suitably secured to the under surface of the plate 40 to co-act with the left hand edge of the shearing bar 13 to shear a film supported on the shear bar 13 when the plate 40 is moved downward.

The means for removing the emulsion from that portion of the film which is to be spliced onto another film is in the form of an attachment generally indicated at 47 (Figs. 4 and 5).

The attachment 47 comprises a guide plate 48 secured to the upper surface of the left hand pressure pad 43 by screws 50. A dovetailed guideway 51 is formed in the guide plate 48 and extends parallel with the shear bar 13. A dovetailed slide 52 is movable along the guideway 51 and has a central projection 53 thereon forming a handle or knob which may be grasped by an operator and reciprocated along the guideway 51. The spindle 54 of a gear pinion 55 is journaled in bearings formed transversely through the center of the slide 52 (Fig. 5). The spindle 54 is resiliently restrained from longitudinal movement by means of a ball 56 provided within a vertical hole formed in the projection 53, which ball 56 engages a circumferential groove 54' formed on the spindle 54 and is pressed thereagainst by a spring 57. A cutting wheel 58 is rigidly secured to the pinion 55 by means of a screw 59. The pinion 55 meshes with a gear rack 60 extending parallel to the guideway 51 and above the pinion 55. The rack 60 is supported by the guide plate 48 through a U-shaped bracket 61. The bracket 61 is secured to the guide plate 48 by screws 62 and is secured to the rack 60 by screws 63.

Cutting teeth 64 are formed on the periphery of the wheel 58. By providing a large number of cutting teeth or edges, the wear on each tooth is considerably reduced. It will be noted on reference to Figs. 1 and 2 that these teeth 64 are cut in a helical formation thus providing a slicing action upon the upper surface of a film due to the angular contact of the cutting edges of the teeth with the film while passing thereover.

On reference to Fig. 4 it will be noted that, due to the fact that the pinion 55 is of smaller diameter than the wheel 58 and also due to the gear rack 60 being positioned above the pinion 55, the periphery of the wheel 58 will move at a relatively higher velocity than the bodily movement of the wheel 58 and in the same direction when the slide 52 is reciprocated.

The operation of the device is as follows: The film supporting plate 40 and the pressure pad 43 comprising the left hand clamp 19 are both raised to a vertical position. The right hand pressure pad 31 is also raised and a film to be spliced is placed in channel 24 of plate 21 with the end of the film extending over the shear bar 13. It is to be understood that the emulsion surface of this film is to be uppermost when placed in the channel 24 and, since this film will be uppermost in the completed splice, the under or clear surface thereof will be cemented to the emulsion side of the film held in the clamp 19. Therefore it is not necessary to scrape the film.

The right hand pressure pad 31 is next lowered in a clamping position to secure the film within the channel 24. The left hand film supporting plate 40 is then lowered causing the shearing member 46 to cut the end of the film along the left hand edge of the shear bar 13. The right hand film supporting plate 21 and pressure pad 31 are then raised, while clamped together by the spring 33 with the sheared film therebetween, to a vertical position. A second film to be spliced is then placed, emulsion uppermost, in the channel 42 of the left hand film supporting plate 40 with the end thereof extending over the shear bar 13. The pressure pad 43 is clamped upon this film to secure the same on the surface of the shear bar 13. While in this position the slide 52 is reciprocated causing the cutting wheel 58 to be moved across the emulsion surface of the film clamped in the channel 42 to remove the emulsion therefrom. A film cement is then applied to the cleaned surface of the end of the film supported on the bar 13. The last step in the operation is performed by lowering the plate 21 and pressure pad 31 together thus bringing the end of the film carried in the channel 24 of plate 21 in overlapped relation with the scraped end of the film supported in the channel 42 of plate 40, these two films being pressed together by the presser bar 37 carried by the pressure pad 31. The overlapped films are retained in a clamped position for a period of time sufficient for the cement to dry, thus forming a completed film splice.

Due to the resilient clamping effect of the spring 45 in engagement with the beveled head of the stud 44 the cutting teeth 64 of cutting wheel 58 will be moved into engagement with the top surface of the shear bar 13 before and after traveling over the surface of the film extending over bar 13. This action will cause a slight wear on the outer tips of the teeth 64, or in other words, will slightly reduce the overall diameter of the wheel 58 thus automatically producing a sharp edge on each of the teeth 64.

Referring more particularly to Fig. 7, it will be noted that the presser bar 37 is narrower than the shear bar 13. Thus when the presser bar is clamped upon the over-lapped ends of a pair of films 66 and 67 with liquid cement provided therebetween, the cement will be partially exuded on either side of the splice to form lumps 68 and 69. Due both to the fact that the film is in a semi-flexible and semi-plastic condition and also to the fact that the lumps 68 and 69 are formed on either side of the film splice, the end 70 of the film 66 as well as the portion 71 thereof immediately adjacent the right hand end of the presser bar 37 will be raised slightly with the cement lodged thereunder. This action insures a generous quantity of cement to form a secure bond at the extreme ends of the two films 66 and 67. Since film cement consists largely of solvents compatible with the cellulose derivative constituting the body of the film, the portions 70 and 71 of the film 66 will be drawn into intimate contact with the adjacent portions of the film 67 when the cement dries. Furthermore, due to the exuded lumps 68 and 69 of film cement, reinforcing fillets 72 and 73 (Fig. 8) will be formed at both extreme ends of the overlapped films.

I claim:

1. A film scraping device comprising a film clamp adapted to clamp a film to be scraped, means on said clamp forming a guideway, a slide movable in said guideway, a film scraping wheel rotatably carried by said slide and adapted to engage said film with the periphery thereof, means on the periphery of said wheel for scraping the surface of said film, a gear rack extending parallel to said guideway, means on said clamp for supporting said rack, and a gear operatively connected to said wheel and meshing with said rack for rotating said wheel when said slide is moved.

2. In a film splicing apparatus, a stationary shear bar, a film clamp adapted to clamp a film in alignment with said bar with one end of said film extending over said bar, a slide, means on said clamp for guiding said slide in a path parallel to said bar, a scraper wheel rotatably carried by said slide, means on the periphery of said wheel for scraping the surface of said film, the periphery of said wheel being adapted to engage the portion of said film extending over said bar when said slide is moved, a gear operatively connected to said wheel, and a gear rack normally extending parallel to said bar and meshing with said gear to rotate said gear when said slide is moved.

3. A film splicing apparatus comprising a base, a film supporting plate on said base, a pressure pad hinged to said base and adapted to clamp a film on said plate, a stationary shear bar adapted to support one end of said film, means on said pad forming a guideway, a slide movable in said guideway, a scraping wheel rotatably carried by said slide and adapted to engage the portion of said film supported by said bar with the periphery thereof, when said pad is in clamping position, and rack and pinion means actuated by the movement of said slide for rotating said scraping wheel.

4. A film splicing apparatus comprising a base, a film supporting plate on said base, a pressure pad hinged to said base and adapted to clamp a film on said plate, a stationary shear bar adapted to support one end of said film, means on said pad forming a guideway, a slide movable in said guideway, a wheel having scraping teeth on the periphery thereof rotatably mounted on said slide, the periphery of said wheel being adapted to engage the surface of said film when said slide is moved, a gear operatively connected to said wheel, a stationary rack carried by said pad and meshing with said gear to rotate said gear when said slide is moved, and a shear member adapted to cooperate with said shear bar for shearing said film adjacent the scraped portion thereof.

ROY C. McCLAY.